United States Patent [19]
Burgess

[11] 3,731,476
[45] May 8, 1973

[54] HEDGE TRIMMER

[75] Inventor: Oakley B. Burgess, Salem, Ill.

[73] Assignee: Alvin L. Shook, Salem, Ill.

[22] Filed: Feb. 14, 1972

[21] Appl. No.: 225,929

[52] U.S. Cl. .................................................. 56/237
[51] Int. Cl. .............................................. A01d 55/00
[58] Field of Search ............................. 56/233, 237

[56] References Cited

UNITED STATES PATENTS

| | | | |
|---|---|---|---|
| 1,839,009 | 12/1931 | Bankson | 56/237 |
| 2,082,610 | 6/1937 | Bankson | 56/237 |
| 2,762,186 | 9/1956 | Janata | 56/233 |
| 2,500,168 | 3/1950 | Du Pont | 56/237 X |
| 3,597,908 | 8/1971 | Schaefer | 56/233 |

*Primary Examiner*—Louis G. Mancene
*Assistant Examiner*—J. A. Oliff
*Attorney*—Edward F. Connors

[57] ABSTRACT

A hedge trimmer has a wheel mounted carriage adapted to be moved parallel to a hedge and supporting an upstanding telescopic shafting which hingedly carries at its upper end a tubular support within which the handle of an electric clipper is lodged. The clipper, through the hinge connection and the shafting, is adjustable in curvilinear paths about horizontal and vertical axes relative to the upstanding shafting and the carriage and is positionable, through the telescopic shafting, at various heights. It is also rotatably adjustable within the tubular support so as to position its cutter bars at various angular positions relative to the support.

6 Claims, 4 Drawing Figures

Patented May 8, 1973

Patented May 8, 1973 3,731,476

HEDGE TRIMMER

BACKGROUND OF THE INVENTION

1. Field of the Invention

The present invention generally appertains to new and novel improvements in horticultural cutting or trimming machines and especially relates to a new and novel machine for trimming hedges.

2. State of the Prior Art

Many diverse types of hedge trimming machines are known whereby the top and sides of a hedge can be cut at any angle. The majority of such machines have a rollable base from which a supporting means vertically upstands. Manually operated or power driven, usually electrically operated, clippers are carried by the supporting means in such a way that the clippers can be disposed in various horizontal and vertical angular positions relative to the supporting means and the base.

One principal drawback associated with such known machines lies in the fact that the adjustment of the clippers is a slow and tedious task that interfers with the desired speedy and efficient trimming of a hedge. Also, the positioning and repositioning of the clippers at various heights is accomplished in a cumbersome and slow manner. The rollable bases are of such a nature that alignment thereof with a hedge and movement thereof at the desired rate and in the selected path relative to the hedge are difficult and detract from the attention that should be given to the desired and obtained shaping of the hedge.

SUMMARY OF THE INVENTION

A primary object of the present invention is to provide a simple, efficient and easily operated, controlled and adjusted hedge trimmer that will overcome the afore-stated drawbacks attendant with known hedge trimming machines.

Another important object of the present invention is to provide a very compact and sturdy trimmer that is economical to manufacture, purchase and maintain and that can be stored in a minimum of space, due to its compact nature, and that can be dependably operated in a safe manner by anyone without any needed skill.

Generally considered, the hedge trimmer of the present invention has a carriage that is mounted on rubber tired wheels, with a pair at the front and a pair at the back of the horizontal base carriage that is in the form of an elongated rod having an inverted U-shaped fixed tubular frame at its opposing ends. Longitudinally aligned legs of the front and rear U-shaped frames carry the wheels, with one pair of aligned legs carrying wheels that have stationary mounts while the other pair of aligned legs carry caster type wheels. The swivel caster type wheels are disposed away from a hedge, with the carriage paralleling the hedge, while the other pair of wheels that are set in a straight line arrangement, parallel to the carriage, are adjacent to the hedge. Such wheel arrangement assists in the easy alignment of the carriage parallel to a hedge and the maintaining of such alignment during trimming of the hedge, with the carriage being easily moved alongside the hedge.

A telescopic shafting upstands from substantially the center of the carriage rod and is in the form of a plurality of telescopically arranged shafts that are locked by set screws in various positions. The upper end of the uppermost shaft supports the inner block end of a tubular support within which the handle of a conventional electric hedge trimmer is soceketed. The handle is locked within the tubular support by set screws with the cord extending through a radial opening in the support for attachment to a source of electrical energy. The trimmer or clipper has its handle end lodged within the tubular support so that the clipper body constitutes an axial projection or prolongation of such tubular support. The clipper handle is rotatable within the tubular support with locking means being provided for securing the clipper handle in selected positions within the tubular support so as to arrange the cutter bars of the clipper at selected angular positions relative to the inner block end of the support.

The block end of the tubular support is formed in two hingedly connected halves or sections with locking means being provided for securing the halves in selected positions. In this way, the clipper can be set from a position in a horizontal plane at right angles to the vertical shafting through various declined angular positions all the way down to a vertical position alongside of and parallel with the vertical shafting. At the same time, the clipper can be set in desired rotative positions with respect to the tubular support and its inner block end.

The shafts of the vertical supporting shafting can be set in various axially extended or withdrawn positions so as to control the height of the clipper and the relative shafts are rotatable with respect to each other so as to enable the clipper to be moved curvilinearly in a horizontal plane. The set screws lock the shafts in the selected axial and rotational interrelated positions.

Handle means is provided on one of the shafts of the shafting so as to enable a user to stand along the outside of the carriage and move the hedge trimmer along a standing hedge with the clipper being adjustable in the myriad ways and such adjustment being effected by the user in a quick and facile way that will offer no delay to the continued movement of the trimmer and the operation thereof.

DESCRIPTION OF THE PREFERRED EMBODIMENT

Figure 1:
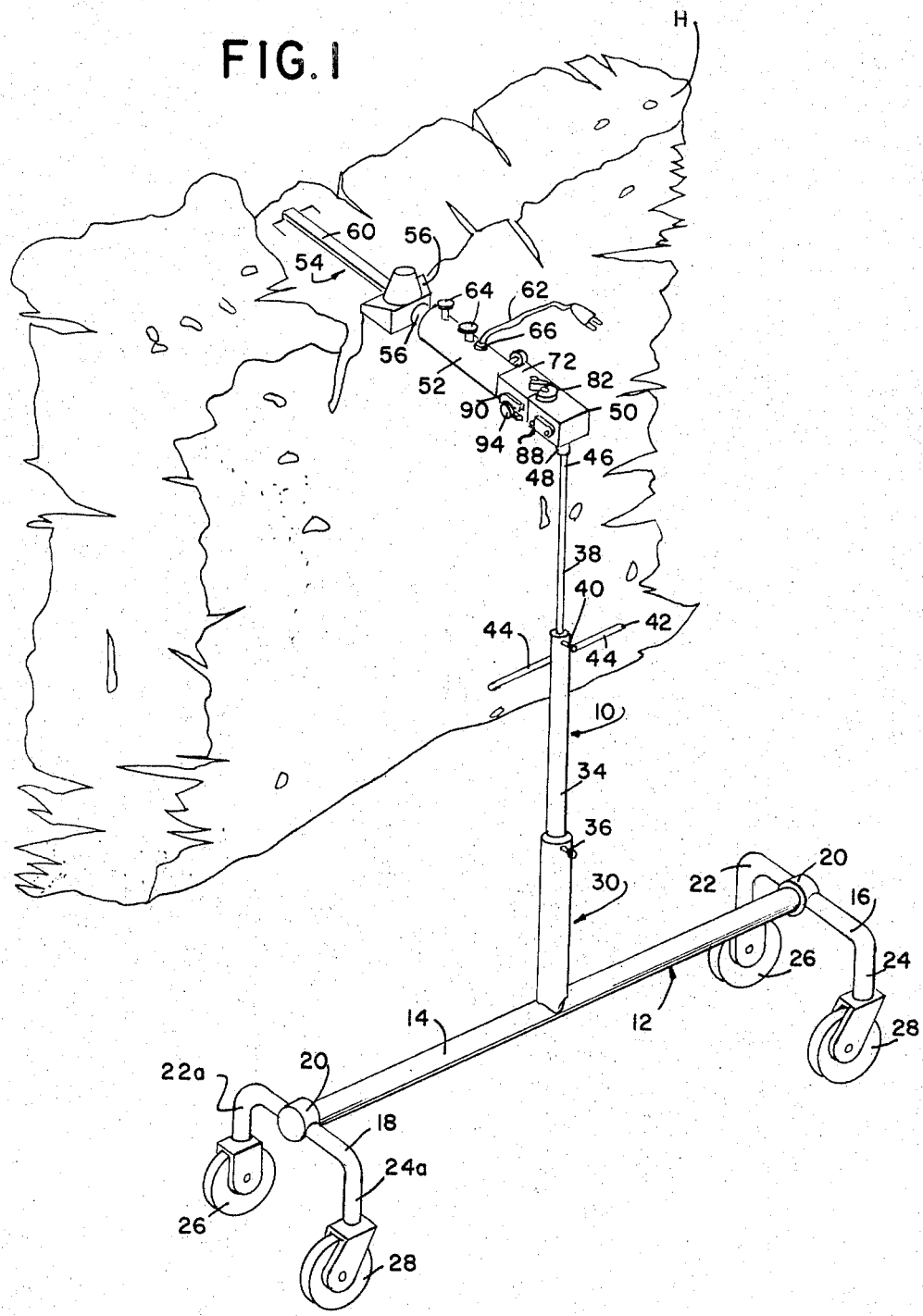
FIG. 1 is a perspective view of a hedge trimmer in accordance with the present invention and showing the same in operation cutting the top of a standing hedge.
Figures 2, 3:
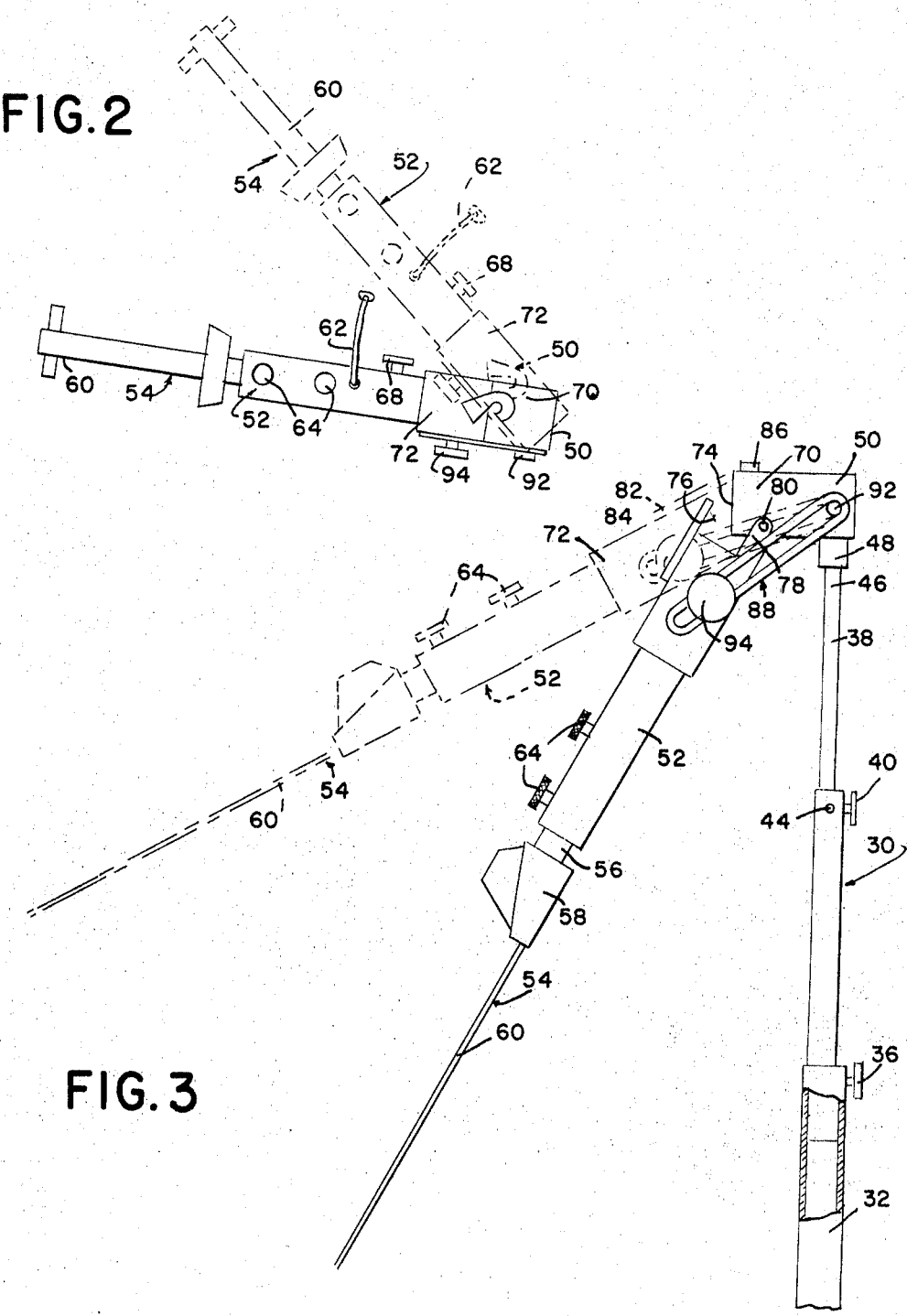
FIG. 2 is a top plan view thereof and showing the adjustability of the clipper in a curvilinear path about a vertical axis while lying in a horizontal plane at right angles to the vertical supporting shafting or while in any angularly declined plane relative thereto or parallel therewith.
FIG. 3 is a side elevational view of the upper portion of the hedge trimmer, showing the adjustability of the clipper in a curvilinear path about a horizontal axis which is defined by a hinge connection between the halves of the inner block end of the tubular support for the clipper handle and showing the locking means for securing the block halves in selected positions of adjustment for the clipper.

Referring now more particularly to the accompanying drawings and initially to FIG. 1, the hedge trimmer or hedge trimming machine 10 includes a movable carriage 12 that is composed of an elongated, horizontally disposed rod 14 having opposing end portions on which inverted U-shaped frames are fixedly mounted at the center of their bight portions. The frames 16 and 18 have fittings 20 provided at the centers of their bight portions to receive the opposing ends of the rod 14.

The frame 16 has depending legs 22 and 24 longitudinally aligned with similar legs 22a and 24a on the frame 18 with the legs 22 and 22a carrying rubber tired wheels 26 that are set in fixed tracking relation parallel with the carriage rod 14. The legs 24 and 24a carry swivel mounted caster type rubber tired wheels 28 that can swivel 360° around the legs. The wheels 28 are disposed in longitudinal alignment on what may be considered the outside of the carriage, with relation to a hedge H, while the set wheels 26 are in longitudinal alignment on the inside of the carriage, that is, in facing adjacency to the hedge H.

The rod 14 and its end frames 16 and 18 may be formed from light weight tubular stock and may be joined together in various ways.

Upstanding from substantially the exact center of the rod 14 is a telescopic vertical supporting shafting 30 which is composed of a fixed lower tubular shaft 32 that is anchored, as by welding, at its lower end to the rod 14. A central tubular shaft 34 is slidably disposed within the lower shaft and extends upwardly therefrom and is axially and angularly adjustable therein. A set screw 36 locks the center shaft in adjusted positions relative to the lower shaft. An upper shaft 38 is slidably and rotatably disposed within the center shaft and is locked in adjusted positions therein by a set screw 40.

Handle means 42 is provided on the shafting 30 for manually grasping in the propulsion and movement of the trimmer 10. Such handle means includes hand rods 44 that laterally project in opposing directions from the upper end portion of the center shaft 34 with the hand rods 44 being parallel with and overlying the carriage rod so as to be on opposite sides of the shafting and facing the front and rear frames 16 and 18.

The upper end portion 46 of the upper shaft 38, which is preferably solid, is fixedly fitted in a collar 48 provided on the underside of the inner block end 50 of a tubular supporting arm 52 which carries a conventional electric clipper 54. The clipper includes an elongated, substantially round handle 56 that supports an actuating assembly 58 from which the cutter bars 60 operatively project in alignment with the handle. The handle is provided with an electric cord 62 adapted to be connected in a suitable manner to a source of electrical power.

The handle 56 is fitted in the tubular supporting arm and held against accidental axial withdrawal therefrom by set screws 64 that seat in appropriate annular grooves in the handle and are radially carried by the wall of the tubular supporting arm. The supporting arm has a radial aperture 66 for the passage therefrom of the electric cord when the handle is socketed in the arm, as shown in FIG. 1. The handle constitutes an axial prolongation of the supporting arm 52 and is rotatable therein so as to dispose the cutter bars 60 in selected angular positions relative to the supporting arm and its inner mounting block end 50. A set screw 68 serves to lock the handle against rotation and to secure it in selected angular placement of the cutter bars.

The inner mounting block end 50 of the tubular supporting arm 52 is formed in two halves or sections 70 and 72 with the section 70 being fixed on the shafting 30 as as to lie in a horizontal plane normal to and at the top of the shafting. The section 72 constitutes the movable half of the block end and is attached to the fixed section 72 for swinging movement about a horizontal axis or an axis lying perpendicular to the shafting 30. The sections 70 and 72 have complementary outer and inner end faces 74 and 76, respectively, which are adapted to abut each other when the movable section is in its closed position in coplanar relation with the fixed section, as shown in FIG. 1.

Figure 4:
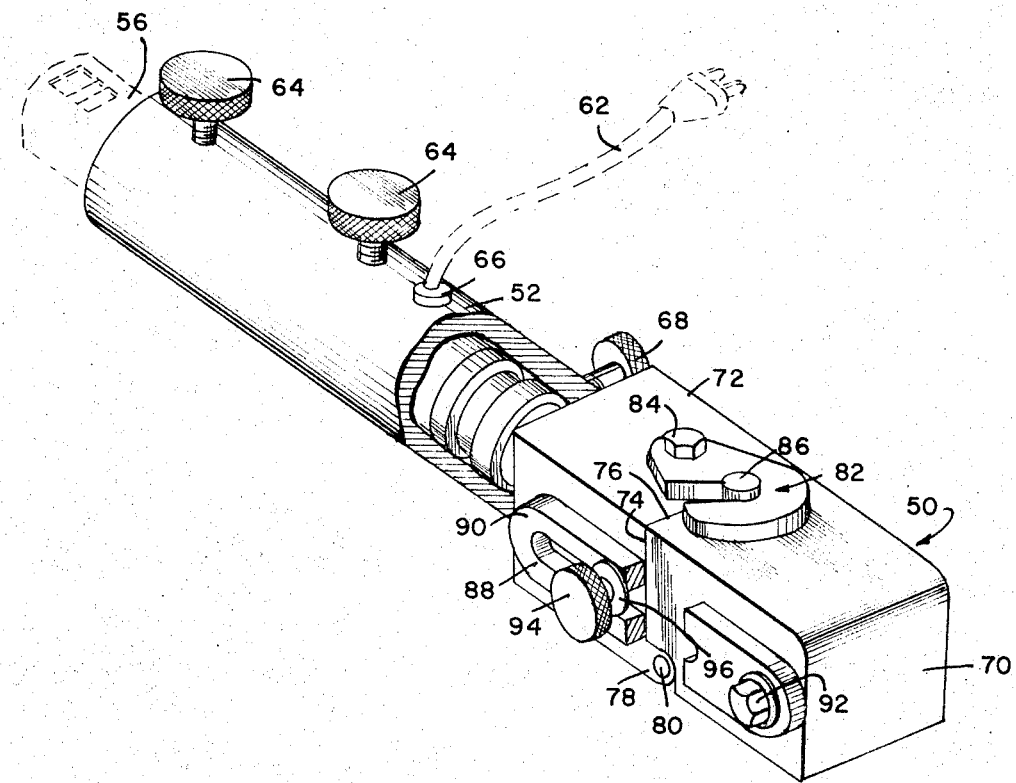
FIG. 4 is an enlarged perspective view of the tubular support for the clipper handle and shows in greater detail the hinge connection between the block halves of the tubular support and the locking means therebetween.

The movable section 72 is provided with apertured ears 78 that project beyond its inner face 76 at the lower end thereof and are mounted on pivot pins 80 so as to define the hinge or pivot connection between the sections. The sections are locked in the closed position, as shown in FIG. 1, by a locking means, shown in greater detail in FIG. 4. Such locking means includes a hook 82 that is rotatably or pivotally mounted on a pin 84 upstanding from the top wall of the movable section 72 and arranged perpendicular to the pivot axis. The hook 82 is formed to grip a lug 86 that upstands from the top wall of the fixed section 70.

The pivot pins 80 are carried by the fixed section 70 to support the movable section 72 with the apertured ears whereby the supporting arm 52 and the carried clipper 54 can move in a curvilinear path about a horizontal axis from a position in a horizontal plane through various angularly declined positions all the way down to a vertical position lying parallel with and alongside the shafting 30.

Locking means 88 is provided for securing the sections 70 and 72 in selected spaced apart relation with the movable section 72 being swung away from the fixed section to the desired extent for selective placement of the clipper cutter bars. The locking means includes an axially slotted bar 90 which is pivotally anchored at one end on a support pin 92 that projects laterally from a side face of the fixed section 70. The bar is slidably positioned on a locking screw 94 carried by the side wall of the movable section 72 with the shank of the thumb screw 94 being disposed in the slot of the bar and the screw having a head that tightens on the bar stock with a suitable washer 96 being provided.

In use the hedge trimmer 10 is easily and quickly positioned alongside the hedge H by virtue of the particular wheel assembly and it is moved along the length of the hedge with ease and with assurance of proper cutting of the hedge. To cut the top of the hedge, as shown in FIG. 1, the sections 70 and 72 are locked by the hook 82 in their closed positions so that the cutter bars 60 are in a horizontal plane. The height of the clipper is set by the placement of the shafts of the supporting shafting 30. To cut the front and back faces of the hedge, the hook 82 is released along with loosening of the screw 94 so as to permit the supporting arm and the clipper to drop to a vertically hanging position alongside the shafting. The parts are locked in such position by the screw 94 after the clipper handle has been rotated 90° and then locked in such set position by the set screw 68. To cut the ends of the hedge or to give the front and rear faces a curved fullness cut the supporting arm and its carried clipper are secured in desired angular positions by the locking means 88.

While the best known form of the present invention has been described herein and shown in the accompanying drawings, it is to be understood that such is merely exemplary in nature and neither the Abstract or the description and drawings are to be considered limitative since the proper scope and spirit of the invention is set forth in the appended claims.

What is claimed is:

1. In a hedge trimmer, a carriage having ground engaging wheels, a vertically oriented supporting means upstanding from the carriage and adjustable vertically and rotatively with respect to the carriage, a supporting tubular arm in which the handle of an electric clipper is socketed with the clipper projecting axially outwardly from the supporting arm and constituting an axial prolongation thereof, means carried by the supporting arm for locking the clipper handle against axial withdrawal from the supporting arm, said clipper handle being rotatable within the supporting arm to dispose the clipper in various angular relationships with respect to the supporting arm, means carried by the supporting arm for locking the handle against rotation for securing the clipper in a set angular relation with respect to the supporting arm, means mounting said arm on the vertical supporting means for movement thereof from a position normal to the supporting means into and from a position parallel therewith and means for locking said arm in such positions and in positions intermediate the same.

2. The invention of claim 1 wherein the supporting arm is provided with a radial opening and said electric clipper has an electric cord adapted to be passed through said opening when the handle is socketed in the supporting arm.

3. The invention of claim 1 wherein said mounting means includes first and second body portions, said first body portion being fixedly supported on the upper end of the vertically oriented supporting means and the second body portion being hingedly attached to the first portion for vertical swinging movement about a horizontal axis from a horizontal position abutting the first body portion into a vertical position at right angles to the first body portion and said supporting arm being fixed to the second body portion.

4. The invention of claim 3 wherein said means for locking the arm includes a hook means pivotally carried by the second body portion and a lug laterally projecting from the first body portion and about which the hook means is adapted to fit so as to lock the second body portion in horizontal alignment with the first body portion.

5. The invention of claim 3 wherein said locking means includes an axially slotted bar pivotally anchored at one end to a side wall of the first body portion and a locking screw carried by a side wall of the second body portion and disposed in the slot of the bar so as to lockingly engage the bar and fixedly dispose the second body portion in various angular positions between the horizontal and the vertical with respect to the first body portion.

6. The invention of claim 3 wherein said vertically oriented supporting means includes a telescopic shafting composed of a series of shafts arranged in axially extensive and rotative interrelation and having locking means for securing them in selected axial and angular interrelationships.

* * * * *